United States Patent
Kotaki et al.

(10) Patent No.: US 7,474,489 B2
(45) Date of Patent: Jan. 6, 2009

(54) STORAGE MEDIUM HOUSING DEVICE

(75) Inventors: Yoshio Kotaki, Kawasaki (JP); Hidetaka Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/902,935

(22) Filed: Sep. 26, 2007

(65) Prior Publication Data

US 2008/0137223 A1    Jun. 12, 2008

(30) Foreign Application Priority Data

Dec. 8, 2006    (JP) ............................. 2006-332497

(51) Int. Cl.
*G11B 19/02* (2006.01)
*G11B 15/04* (2006.01)

(52) U.S. Cl. ............................. 360/69; 360/71; 360/60

(58) Field of Classification Search ........................ None
See application file for complete search history.

(56) References Cited

U.S. PATENT DOCUMENTS

| 6,710,962 B1 * | 3/2004 | Caverly et al. ................. 360/69 |
| 2003/0039051 A1 * | 2/2003 | Taki et al. ...................... 360/69 |
| 2003/0067701 A1 * | 4/2003 | Christie ........................ 360/60 |
| 2004/0190179 A1 * | 9/2004 | Kato et al. ..................... 360/69 |

FOREIGN PATENT DOCUMENTS

JP    08-287012    11/1996

OTHER PUBLICATIONS

"Eternus F6476M/S Tape Device", Fujitsu HP, Japan, URL:http://storage-system.fujitsu.com/jp/products/tape/f6476ms, 1994.

* cited by examiner

*Primary Examiner*—Andrew L. Sniezek
(74) *Attorney, Agent, or Firm*—Staas & Halsey LLP

(57) ABSTRACT

In a magnetic tape device, upon receiving a magnetic tape cartridge from an insertion slot, an authentication unit reads data that is stored in an electronic tag and based on the read data, checks validity of the magnetic tape cartridge. A robot conveys only a valid magnetic tape cartridge to a drive.

3 Claims, 12 Drawing Sheets

FEEDER BELT 42

STOPPER-RELEASING UNIT 41

STOPPER-RELEASING UNIT 41

42 FEEDER BELT

10 MAGNETIC TAPE CARTRIDGE

41 STOPPER-RELEASING UNIT

42 FEEDER BELT

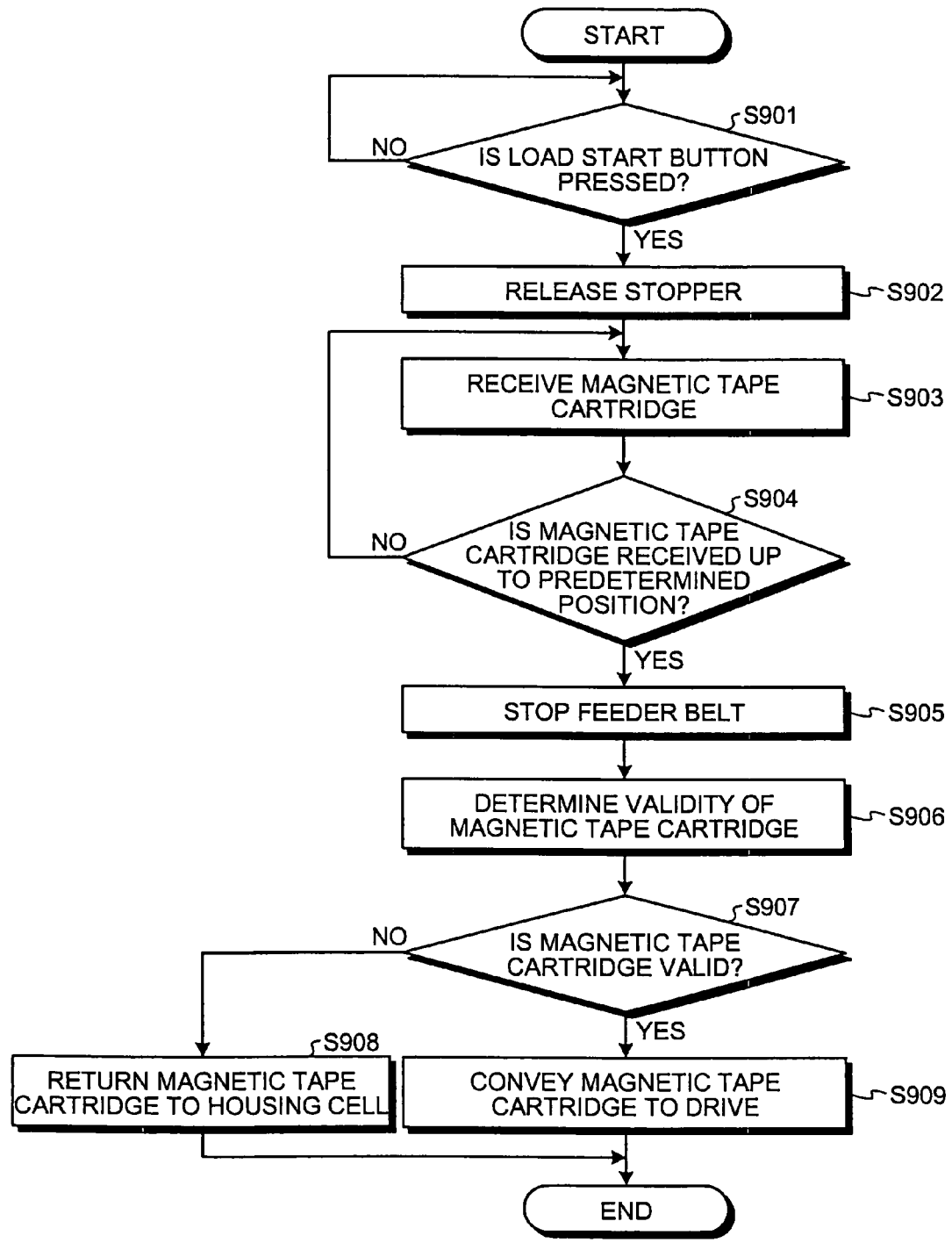

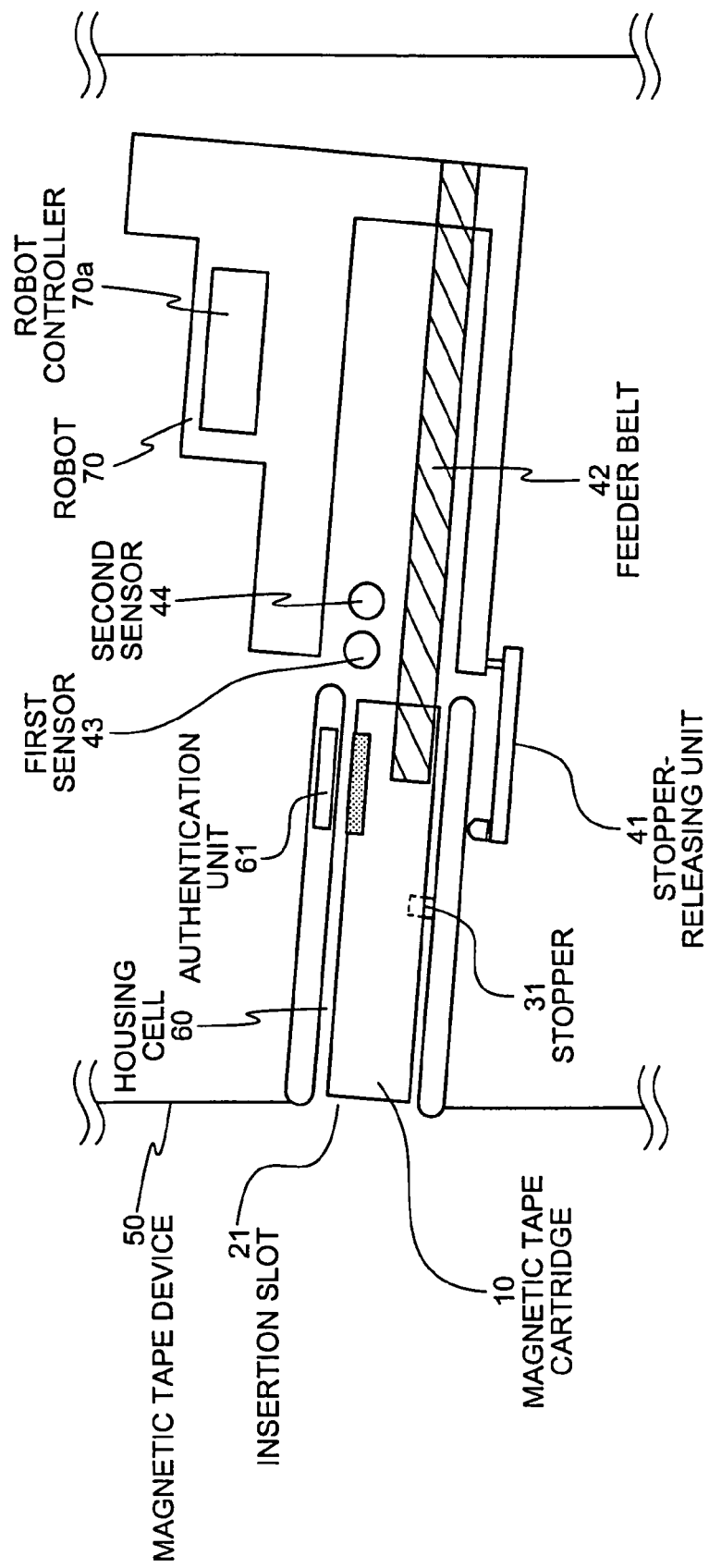

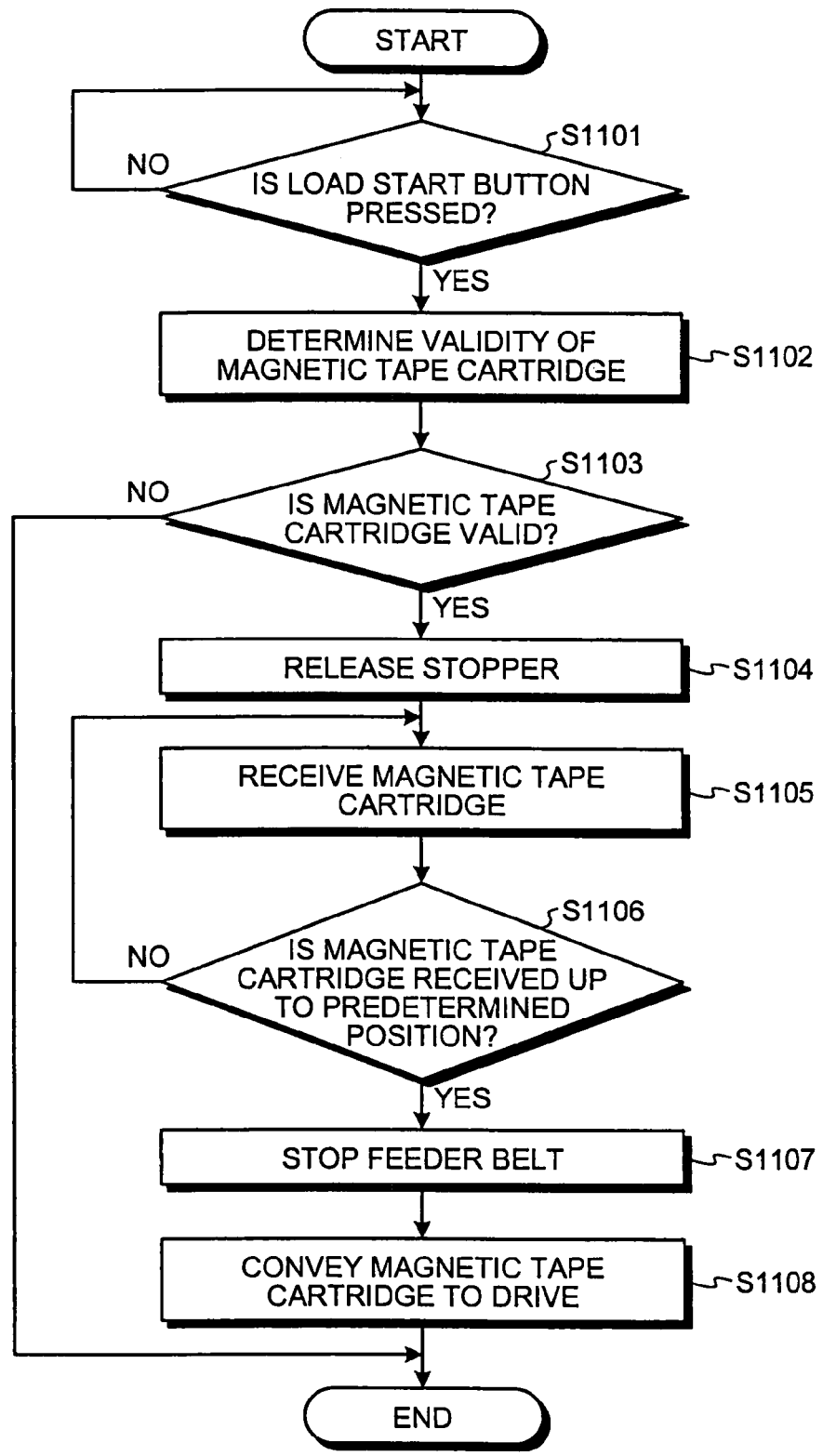

STORAGE MEDIUM HOUSING DEVICE

BACKGROUND OF THE INVENTION

1. Field of the Invention

The present invention relates to a storage medium housing device having a security mechanism for securely receiving a storage medium.

2. Description of the Related Art

A typical storage medium housing device includes an insertion slot to receive a storage medium that is created based on predetermined standards. The storage medium is housed in a housing cell of the storage medium housing device. Once the storage medium is housed in the housing cell, the storage medium housing device can transfer data stored in the storage medium to an external electronic device. The storage medium housing device internally includes a robot to convey the storage medium. Upon receiving predetermined operations, the robot first receives the storage medium that is housed in the housing cell, and then conveys the storage medium to a drive that carries out reading and writing of data with respect to the storage medium.

In a typical storage medium housing device, when the storage medium is inserted by a user from the insertion slot, the storage medium is received and housed only when the storage medium can be housed physically. For example, in a conventional magnetic tape device "ETERNUS F6476M/S tape device", [online], [searched on Oct. 31, 2006], Internet (http://storage-system.fujitsu.com/jp/products/tape/f6476 ms/), an entire 36-track record keeping magnetic tape cartridge (conforming to International Organization for Standardization/International Electrotechnical Commission (ISO/IEC) 14251, (X) 6135, InterNational Committee for Information Technology Standards (INCITS) 261-1996) that is inserted from the insertion slot is received and housed.

In the conventional magnetic tape device, the storage medium is received without checking a validity of the storage medium. In other words, the storage medium is received without checking, for example, whether the storage medium is manufactured by a guaranteed manufacturer, whether the storage medium is a genuine storage medium, or whether the storage medium includes a malicious code. Thus, security of the conventional magnetic tape device is not assured.

One approach could be to provide an external device near the housing cell that checks validity of storage medium and conveys only a valid storage medium to the storage medium housing device. Provision of such an external device, however, increases the overall size of the original storage medium housing unit.

SUMMARY OF THE INVENTION

It is an object of the present invention to at least partially solve the problems in the conventional technology.

According to an aspect of the present invention, a storage medium housing device internally includes a robot that conveys, from a housing cell that temporarily retains therein a storage medium that is inserted from an insertion slot, the storage medium to a drive that carries out reading and writing of data with respect to the storage medium, and causes the robot to convey, after receiving the storage medium from the housing cell, the storage medium to the drive. The magnetic tape device includes an authentication unit that checks validity of a storage medium that is inserted from the insertion slot; and a robot controller that controls the robot such that the storage medium is conveyed to the drive upon the authentication unit recognizing that the storage medium is valid, and the robot such that the storage medium is not conveyed to the drive upon the authentication unit recognizing that the storage medium is non-valid.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart of processes performed by the magnetic tape device according to the first embodiment;

FIG. 10 is a schematic of a magnetic tape device according to a second embodiment; and FIG. 11 is a flowchart of processes performed by the magnetic tape device according to the second embodiment.

DETAILED DESCRIPTION OF THE PREFERRED EMBODIMENTS

Exemplary embodiments the present invention are explained in detail below with reference to the accompanying drawings.

Figure 1:
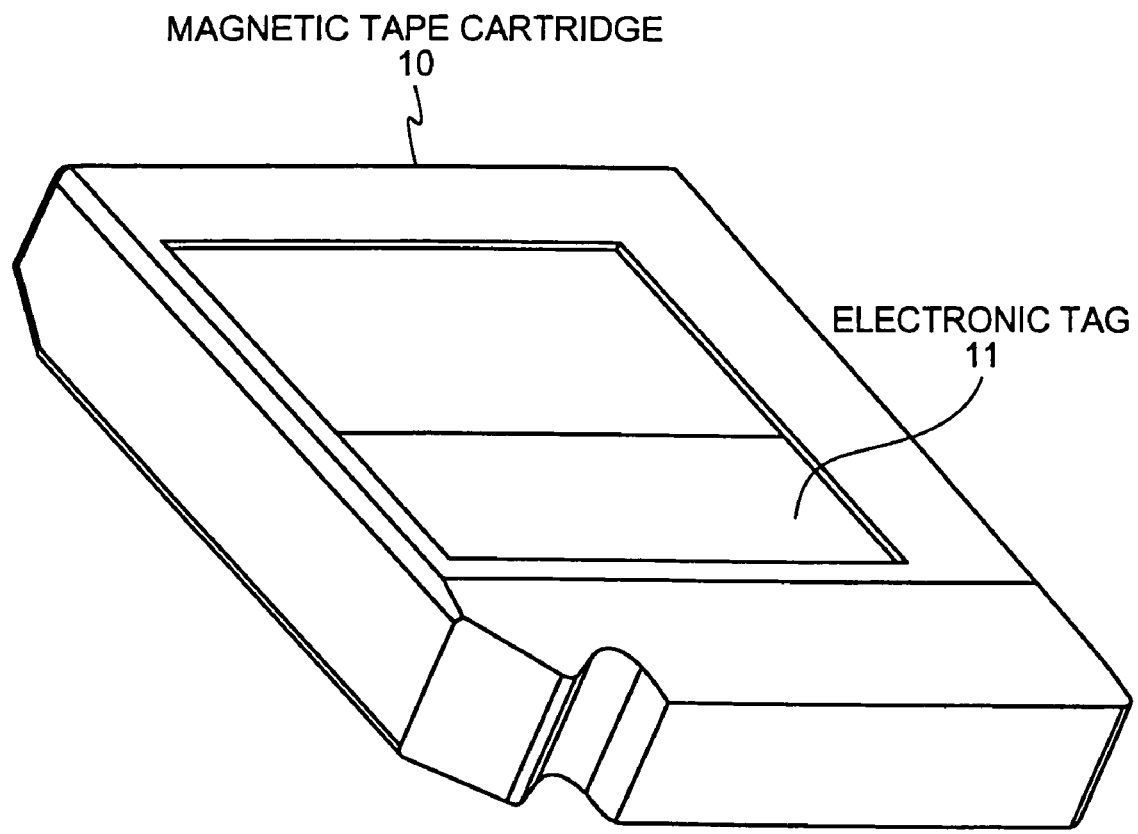
FIG. 1 is a perspective of a magnetic tape cartridge.

Important terms used in the present embodiment are explained first. The terms "magnetic tape cartridge" or "storage medium" refers to a type of a portable external storage device. As shown in FIG. 1, a magnetic tape cartridge 10 is a magnetic-coated tape that is fitted in a case. An electronic tag 11 that stores therein individual data of the magnetic tape cartridge 10 is assigned on a surface of the magnetic tape cartridge 10.

Figure 2:
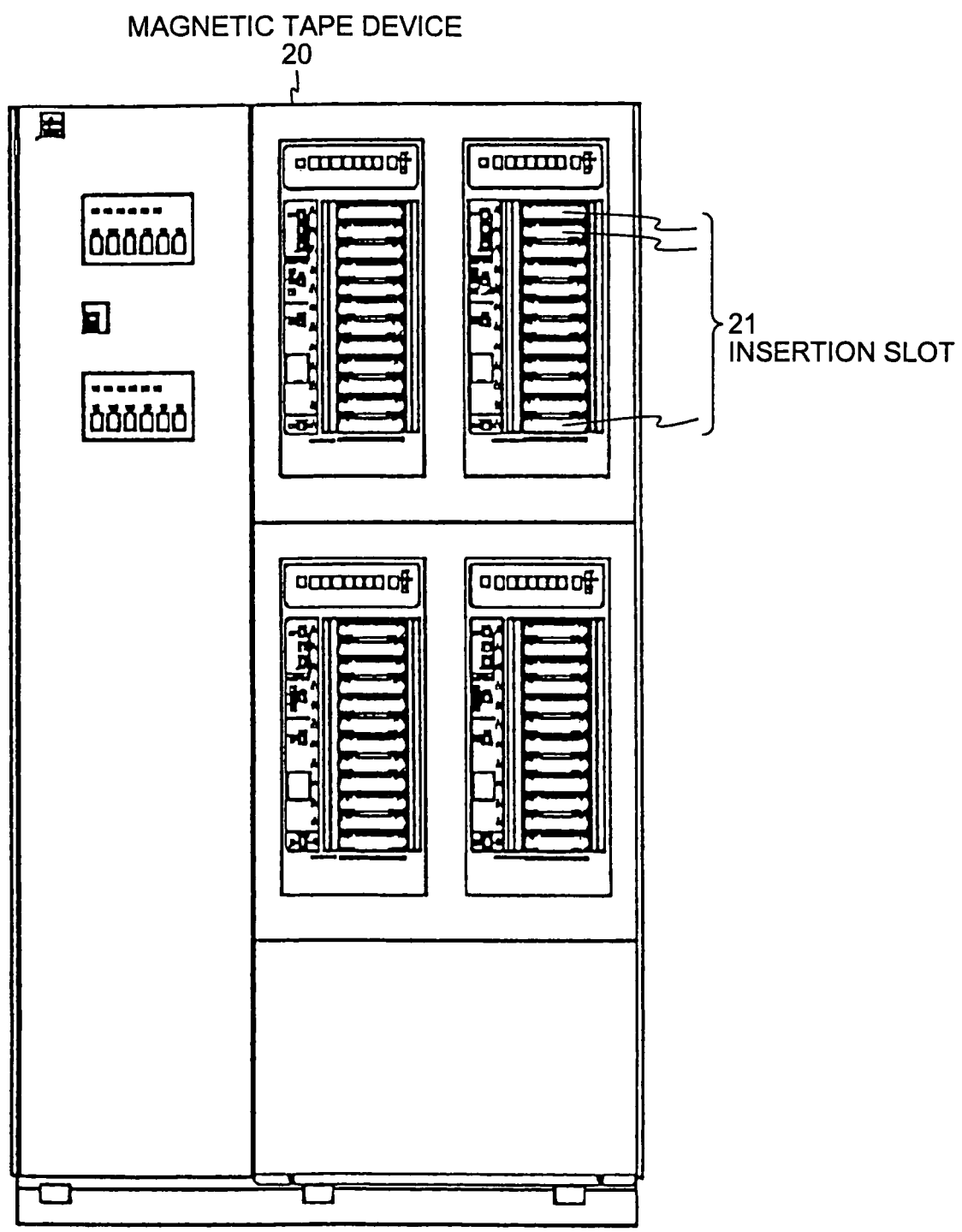
FIG. 2 is a schematic of a magnetic tape device.

Further, the term "magnetic tape device" or "storage medium housing device" refers to a device that carries out reading and writing of data with respect to the magnetic tape cartridge 10. As shown in FIG. 2, a magnetic tape device 20 includes on an anterior surface of a device, a plurality of insertion slots 21 for inserting the magnetic tape cartridge 10 and the magnetic tape cartridge 10 is received from the insertion slot 21.

Figure 3:
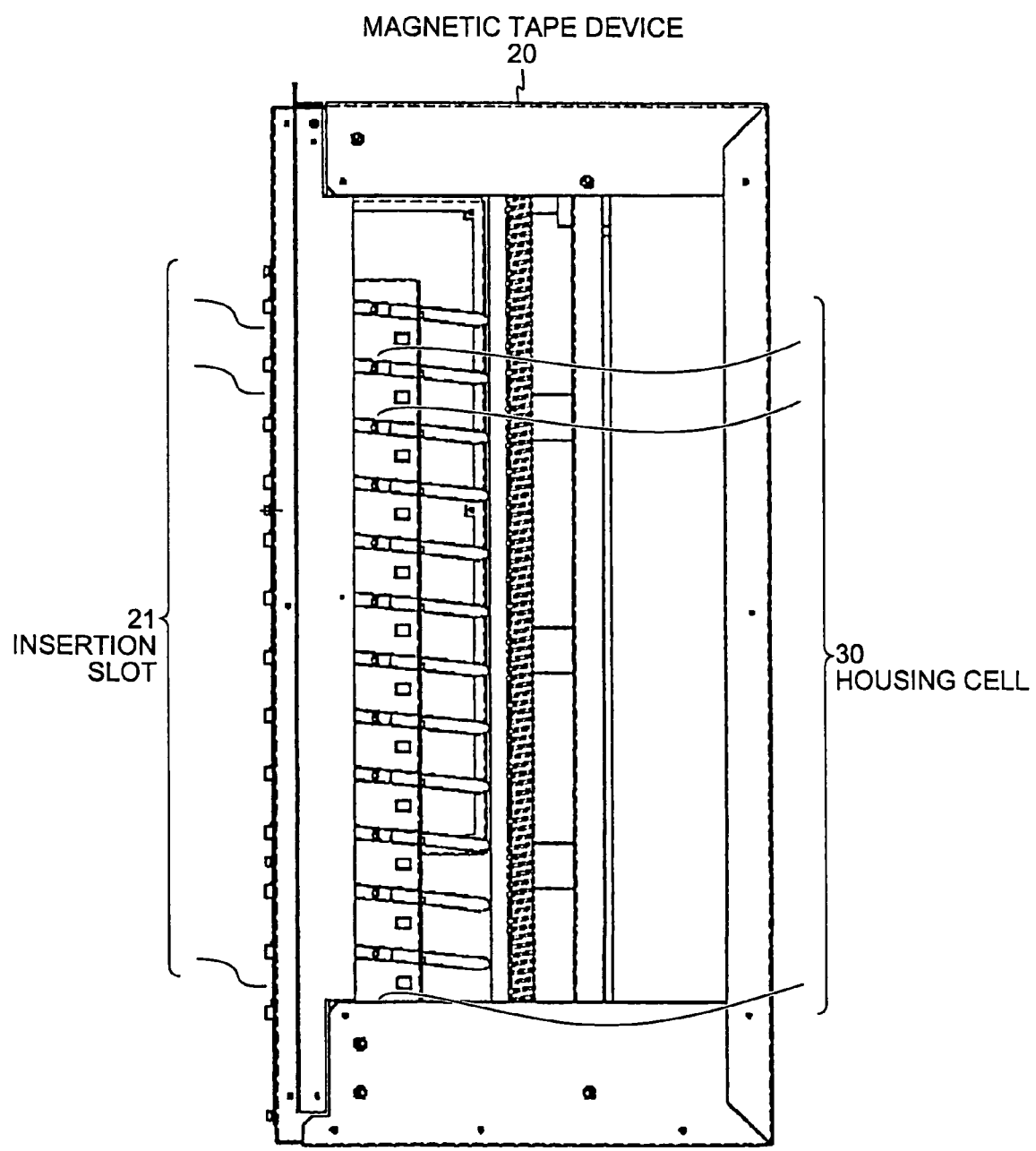
FIG. 3 is a schematic of a housing cell.

The term "housing cell" or "housing cell" refers to a block inside the magnetic tape device 20, which temporarily retains therein the magnetic tape cartridge 10. As shown in FIG. 3, a housing cell 30 retains the magnetic tape cartridge 10 in a space that continues inside the magnetic tape device 20 from the insertion slot 21. Further, FIG. 3 is a schematic of one of the insertion slots 21 of the magnetic tape device 20 that are divided into four blocks as shown in FIG. 2.

Figure 4:
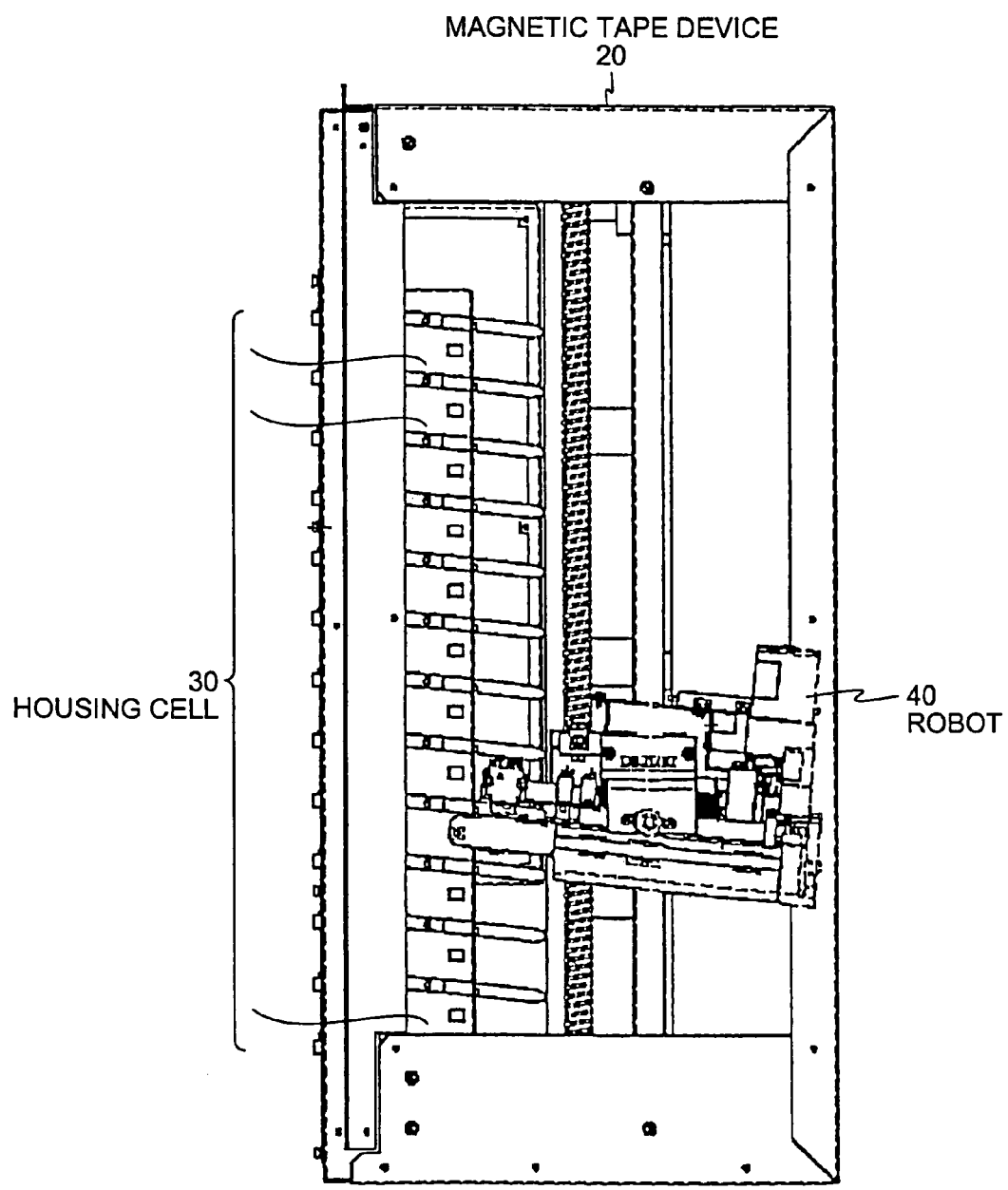
FIG. 4 is a schematic of a robot.

Further, the term "robot" refers to a mechanism that picks up the magnetic tape cartridge 10 from the housing cell 30 and keeps within itself and conveys the magnetic tape cartridge 10 to a drive that carries out reading and writing of data. The robot carries out such sequence of actions while being controlled by the magnetic tape device 20. As shown in FIG. 4, a robot 40 passes through each housing cell 30 by moving inside the magnetic tape device 20 and after receiving the magnetic tape cartridge 10, conveys the magnetic tape cartridge 10 to the drive.

FIGS. 5A to 5D are schematics for explaining the overview and the salient features of the magnetic tape device according to the first embodiment.

The magnetic tape device according to the first embodiment internally includes the robot that conveys the magnetic tape cartridge from the housing cell to the drive. After receiving the magnetic tape cartridge from the housing cell, the robot conveys the magnetic tape cartridge to the drive.

Figure 5A:
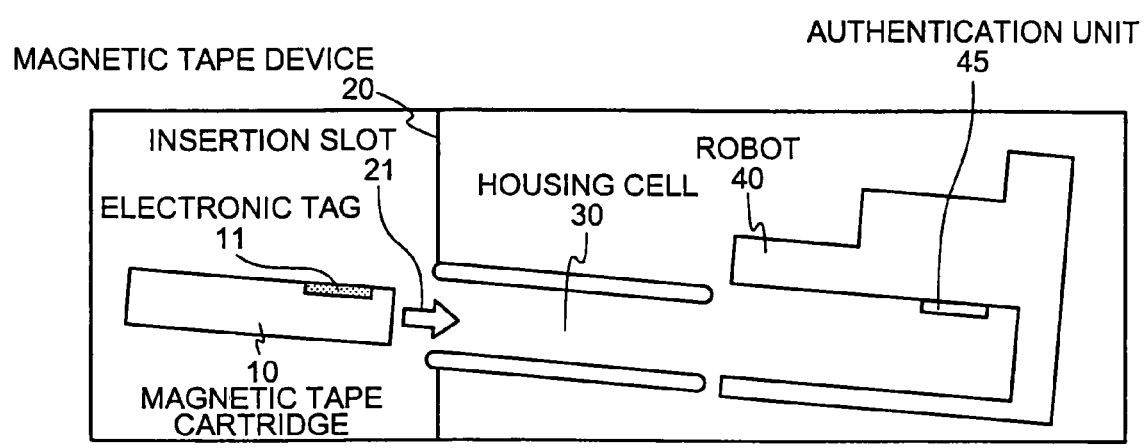
FIGS. 5A to 5D are schematics for explaining an overview and salient features of the magnetic tape device according to a first embodiment.

Specifically, as shown in FIG. 5A, the magnetic tape device 20 receives the magnetic tape cartridge 10 from the insertion slot 21 and an authentication unit 45 checks validity of the magnetic tape cartridge 10 that is inserted from the insertion slot 21. The magnetic tape cartridge 10 temporarily remains in the housing cell 30 until it is pulled in the inside of the robot 40.

Figure 5B:
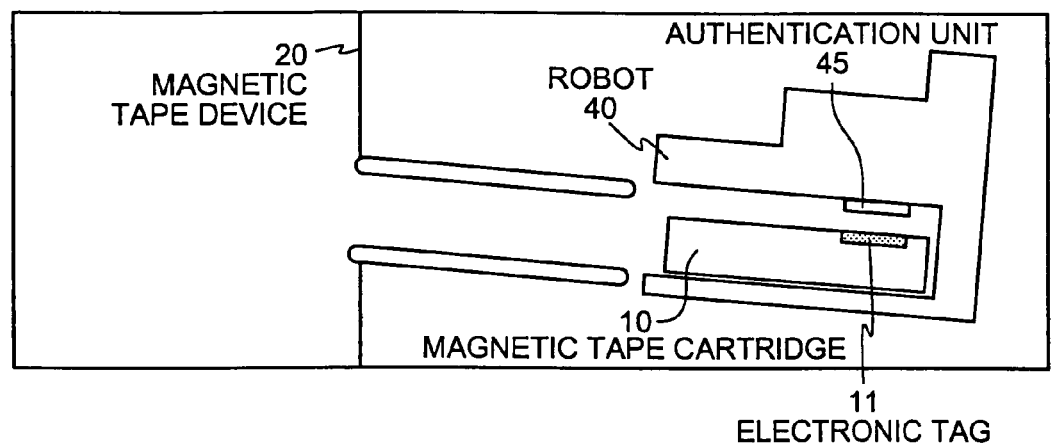

As shown in FIG. 5B, in the magnetic tape device 20, upon the robot 40 receiving the magnetic tape cartridge 10, the authentication unit 45 reads data stored in the electronic tag 11 and based on the read data, and checks validity of the magnetic tape cartridge 10 from the read data.

Figure 5C:
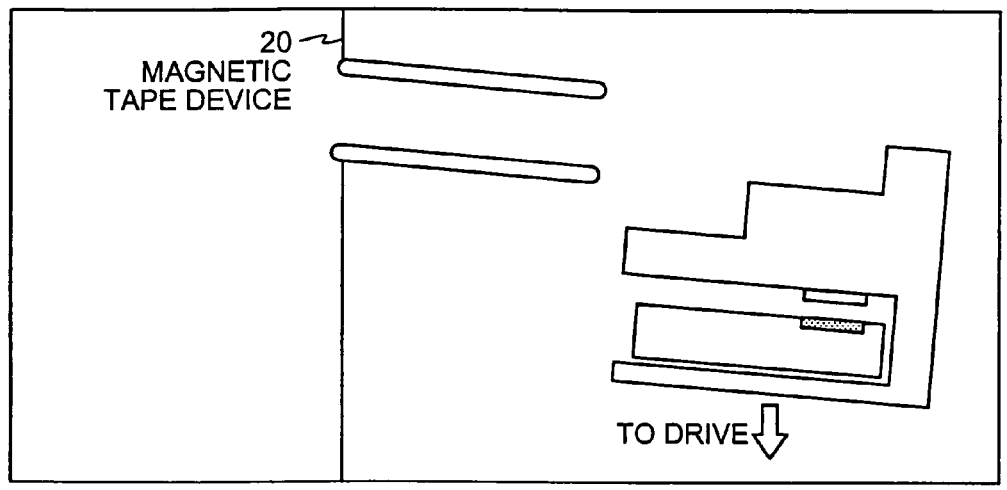

When the authentication unit 45 recognizes that the magnetic tape cartridge 10 is valid, as shown in FIG. 5C, the magnetic tape device 20 controls the robot 40 such that the magnetic tape cartridge 10 will be conveyed to the drive. The robot 40 conveys the magnetic tape cartridge 10 to a drive (not shown) by moving in a direction of an arrow.

Figure 5D:
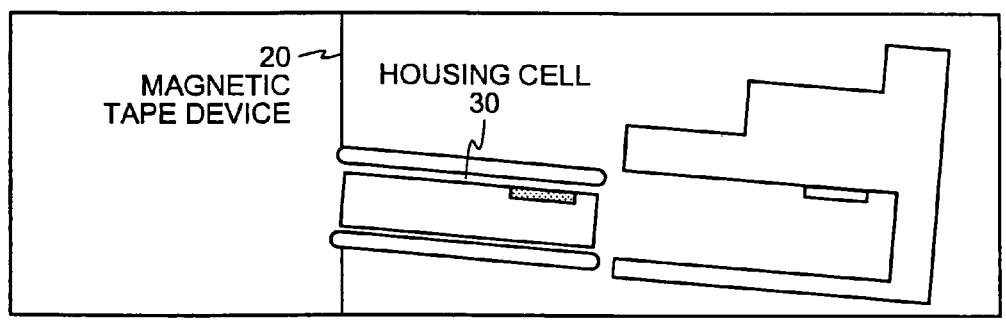

However, when the authentication unit 45 can not recognize whether the magnetic tape cartridge 10 is valid, as shown in FIG. 5D, the magnetic tape device 20 returns the magnetic tape cartridge 10 to the housing cell 30 and controls the robot 40 such that the magnetic tape cartridge 10 will not be conveyed to the drive.

Thus, the magnetic tape device according to the first embodiment checks validity of the magnetic tape cartridge within itself and conveys only a valid magnetic tape cartridge to the drive. With this configuration, it is possible to realize security assurance with a compact structure.

Figure 6:
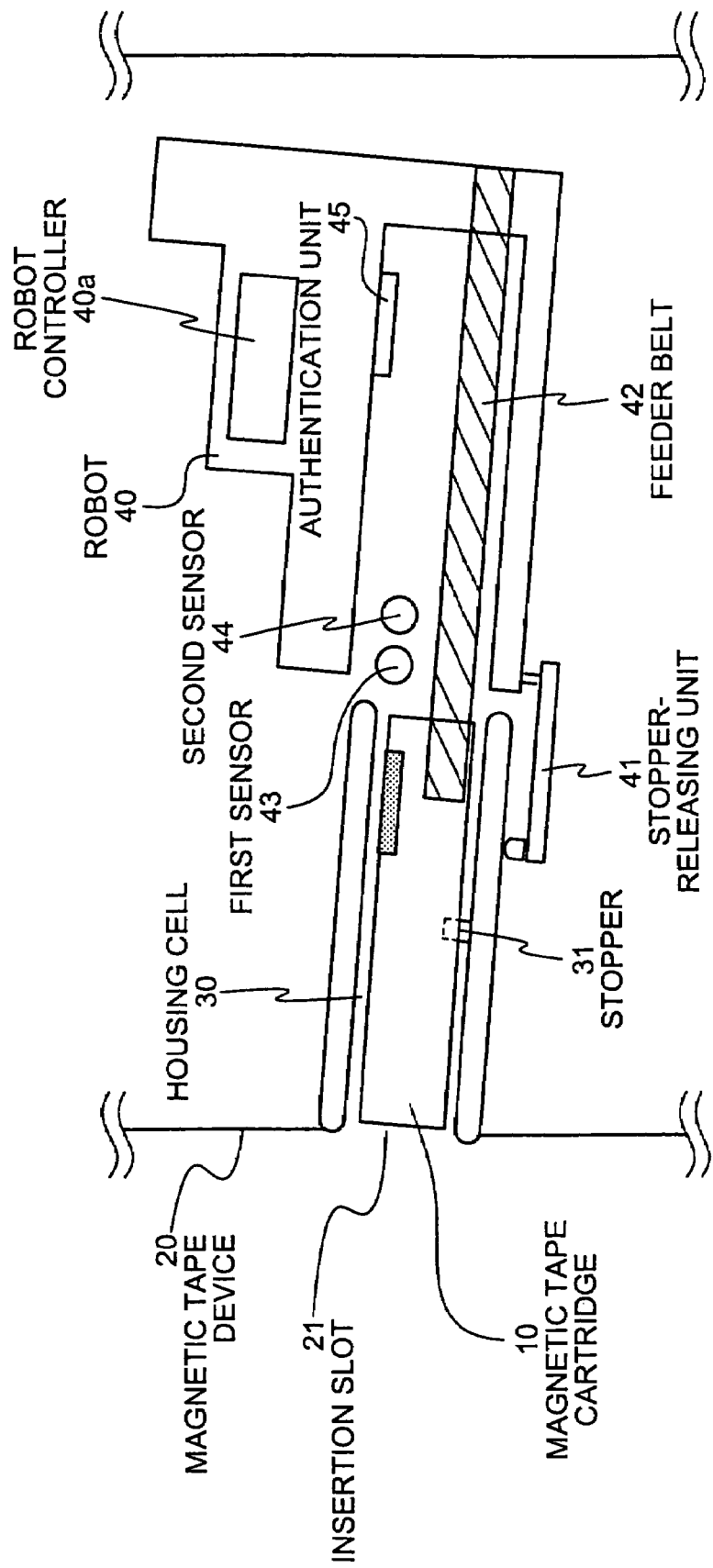
FIG. 6 is a schematic of the magnetic tape device according to the first embodiment.
Figure 7A:
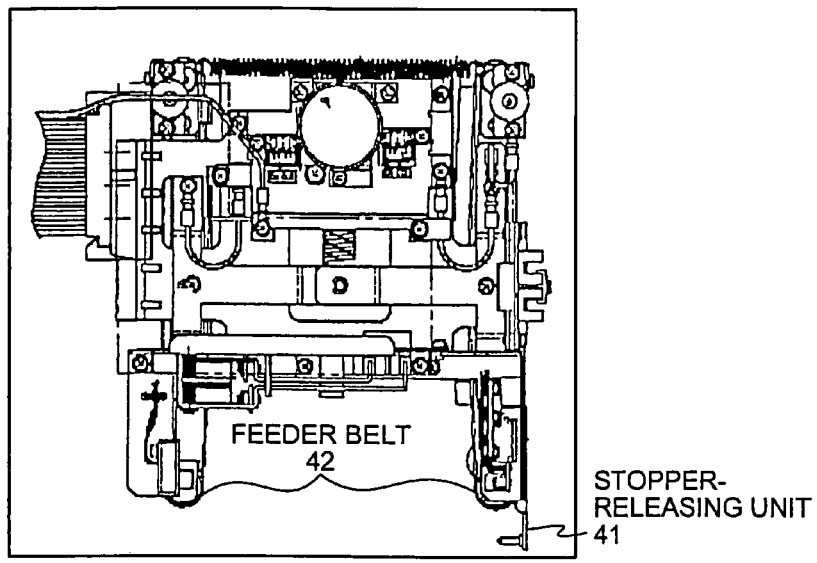
FIGS. 7A to 7C are schematics of the robot.
Figure 7B:
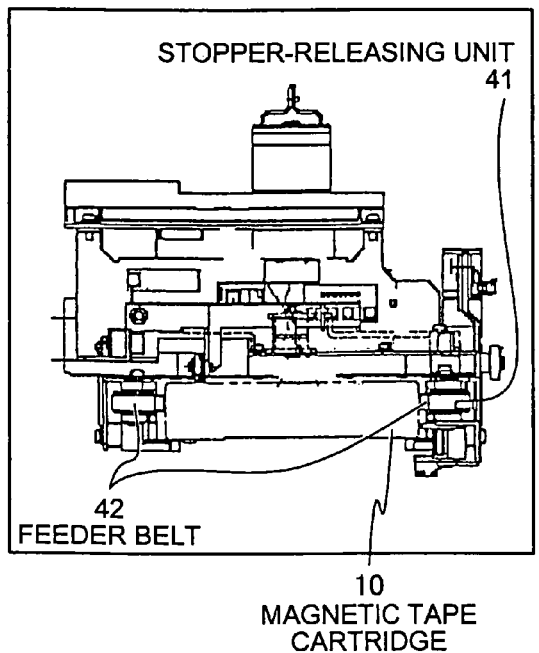
Figure 7C:
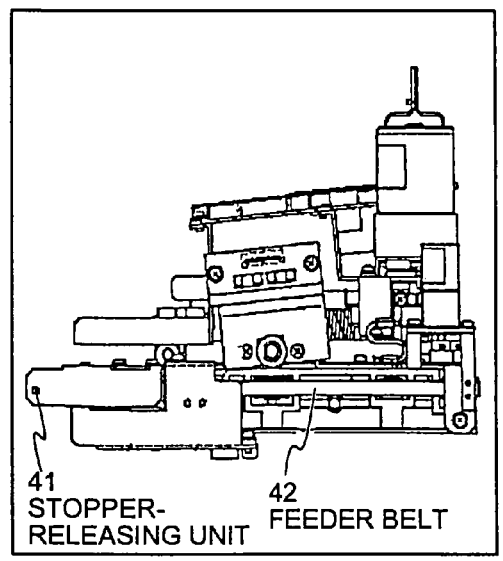
Figure 8A:
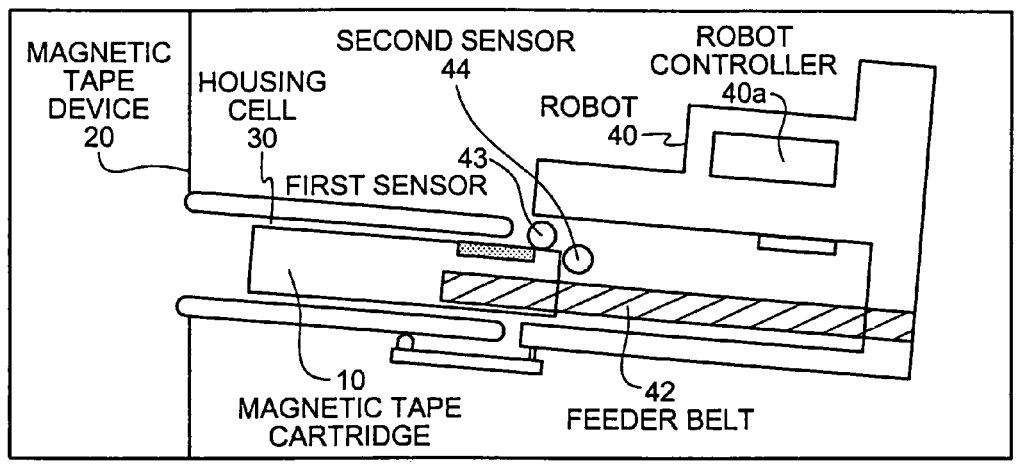
FIGS. 8A to 8C are schematics for explaining an operation of a first sensor and a second sensor.
Figure 8B:
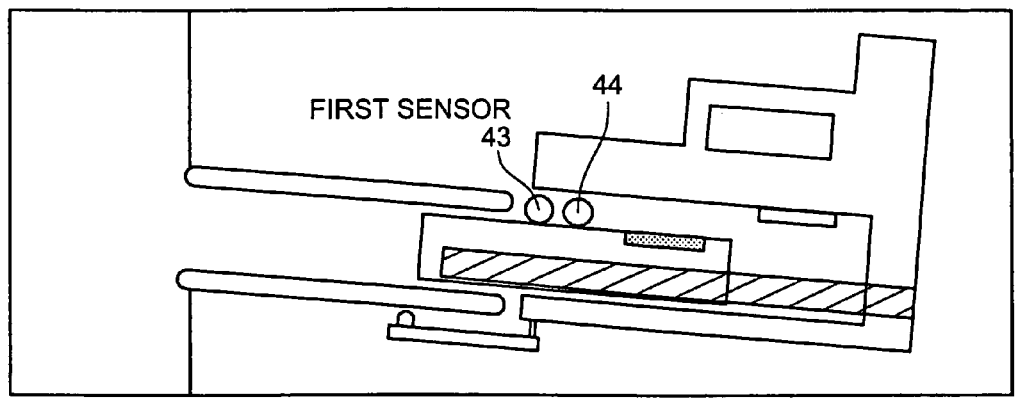
Figure 8C:
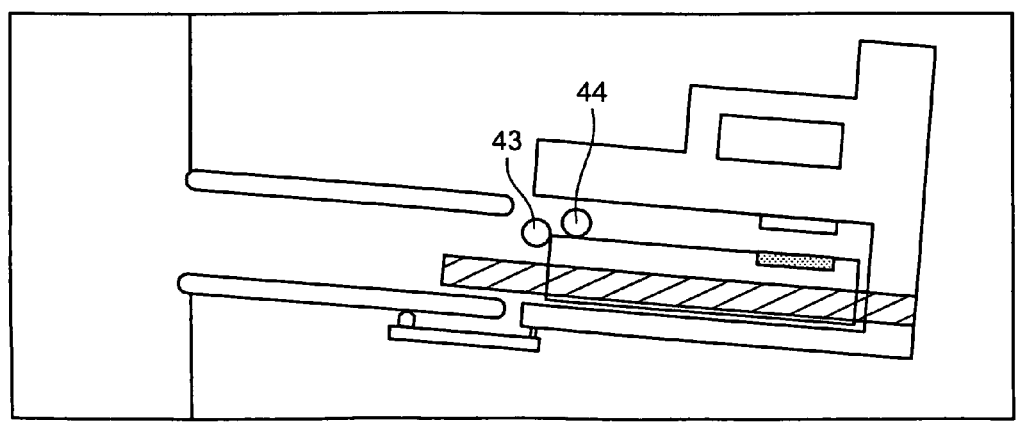

The structure of the magnetic tape device 20 according to the first embodiment is explained with reference to FIGS. 6 to 8C. FIG. 6 is a schematic of the magnetic tape device 20. FIGS. 7A to 7C are schematics of the robot 40 (FIG. 7A is a top view of the robot 40. FIG. 7B is an anterior view of the robot 40. FIG. 7C is the anterior view of the robot 40 from the right side). FIGS. 8A to 8C are schematics for explaining an operation of a first sensor and a second sensor. Among the structure of the magnetic tape device 20, the structure for receiving the magnetic tape cartridge 10 is explained below that is closely related to the present invention.

As shown in FIG. 6, as a structure for receiving the magnetic tape cartridge 10, in addition to the insertion slot 21 that is set on the anterior surface so that the user can insert the magnetic tape cartridge 10 inside the magnetic tape device 20, the magnetic tape device 20 according to the first embodiment includes the housing cell 30 and the robot 40. The insertion slot 21 passes the magnetic tape cartridge 10 through the space of the housing cell 30 and the housing cell 30 continues passing inside the magnetic tape device 20 up to the innermost depth of the robot 40.

As shown in FIG. 6, the housing cell 30 includes a stopper 31 for ensuring a bound state in which a movement of the magnetic tape cartridge 10 is stopped inside the housing cell 30 in a direction from the housing cell 30 to the robot 40. The housing cell 30 temporarily retains therein the magnetic tape cartridge 10. For example, a depression of a predetermined shape or size is already set in the magnetic tape cartridge 10 and the housing cell 30 causes a protrusion that is inserted in the depression to function as the stopper 31. If the user pushes the magnetic tape cartridge 10 that is inserted from the insertion slot 21 up to a predetermined position, because the protrusion is inserted in the depression of the magnetic tape cartridge 10, in the housing cell 30, the bound state is ensured in which the movement of the magnetic tape cartridge 10 is stopped in the direction from the housing cell 30 to the robot 40.

As shown in FIG. 6, the robot 40 includes a robot controller 40a, a stopper-releasing unit 41, a feeder belt 42, a first sensor 43, a second sensor 44, and the authentication unit 45. Upon receiving the magnetic tape cartridge 10 from the housing cell 30 within itself, the robot 40 conveys the magnetic tape cartridge 10 to the drive.

The robot controller 40a controls the sequence of actions of the robot 40. When the later explained authentication unit 45 recognizes validity of the magnetic tape cartridge 10, the robot controller 40a controls the robot 40 such that only a valid the magnetic tape cartridge 10 is conveyed to the drive. Further, when the authentication unit 45 can not recognize whether the magnetic tape cartridge 10 is valid, the robot controller 40a controls the robot 40 such that the magnetic tape cartridge 10 will be returned to the housing cell 30 instead of being conveyed to the drive.

To be specific, upon receiving from the magnetic tape device 20, signals indicating that the operation is started, the robot controller 40a controls each unit of the robot 40. Upon the robot 40 receiving the magnetic tape cartridge 10 from the housing cell 30 or upon determining the validity of the magnetic tape cartridge 10, the robot controller 40a causes the robot 40 to convey the magnetic tape cartridge 10 to the drive or causes to return the magnetic tape cartridge 10 to the housing cell 30.

The robot controller 40a controls the stopper-releasing unit 41 that releases the magnetic tape cartridge 10 from the bound state. For example, with respect to the bound state that is created by the depression of the magnetic tape cartridge 10 and the protrusion of the housing cell 30, the stopper-releasing unit 41 holds down a predetermined part of the housing cell 30 and extracts the protrusion that is inserted in the depression of the magnetic tape cartridge 10 and releases the magnetic tape cartridge 10 from the bound state. Further, as shown in FIG. 7A, an arm is elongated towards the housing cell 30 and the stopper-releasing unit 41 is positioned at the end of the robot 40.

The robot controller 40a controls the feeder belt 42 and causes the feeder belt 42 to move the magnetic tape cartridge 10 from the housing cell 30 to the robot 40. To be specific, the feeder belt 42 holds the magnetic tape cartridge 10 from both sides and rotates the magnetic tape cartridge 10. Due to friction occurred between the magnetic tape cartridge 10 and a material of the feeder belt 42, the magnetic tape cartridge 10 is moved in the direction of the robot 40 or the magnetic tape cartridge 10 that is already received inside the robot 40 is moved in the direction of the housing cell 30. Further, as shown in FIG. 7A, the feeder belt 42 faces the position holding the magnetic tape cartridge 10 from both sides.

The first sensor 43 and the second sensor 44 detect an existence of the magnetic tape cartridge 10 and output the signals (for example, data indicating ON or OFF) to the robot controller 40a. When specifically explained using FIG. 8, as shown in FIG. 8A, when the feeder belt 42 moves the magnetic tape cartridge 10, the first sensor 43 is pushed up by the magnetic tape cartridge 10, and the first sensor 43 detects the existence of the magnetic tape cartridge 10 and outputs ON signals to the robot controller 40a. Further, while the magnetic tape cartridge 10 is moving from the housing cell 30 to the robot 40, the first sensor 43 detects the existence of the magnetic tape cartridge 10 prior to the second sensor 44.

As shown in FIG. 8B, when the feeder belt 42 further moves the magnetic tape cartridge 10, the second sensor 44 is similarly pushed up by the magnetic tape cartridge 10 and the second sensor 44 detects the existence of the magnetic tape cartridge 10 and outputs the ON signals to the robot controller 40a. Further, upon receiving the ON signals from the first sensor 43 and the second sensor 44 in sequence, the robot controller 40a realizes that the magnetic tape cartridge 10 is moving normally from the housing cell 30 to the robot 40 and continues the operation of the feeder belt 42.

As shown in FIG. 8C, when the feeder belt 42 further moves the magnetic tape cartridge 10, the first sensor 43 that is pushed up by the magnetic tape cartridge 10 returns to an original position and the first sensor 43 outputs OFF signals to the robot controller 40a. Further, upon receiving the OFF signals from the first sensor 43, the robot controller 40a realizes that the magnetic tape cartridge 10 is moved to the predetermined position and stops the operation of the feeder belt 42.

The authentication unit 45 checks validity of the magnetic tape cartridge 10 that is received inside the robot 40 and that is in the status prior to startup of the conveyance by the robot 40. To be specific, the authentication unit 45 communicates with the electronic tag 11 that is assigned on the surface of the magnetic tape cartridge 10 and reads the data stored in the electronic tag 11. Based on the read data, the authentication unit 45 determines whether the magnetic tape cartridge 10 is valid, and outputs authentication results to the robot controller 40a.

(Magnetic Tape Cartridge Receiving Process Performed by the Magnetic Tape Device According to the First Embodiment)

FIG. 9 is a flowchart of processes performed by the magnetic tape device 20.

As shown in FIG. 9, if the user presses a load start button when the magnetic tape cartridge 10 is retained in the housing cell 30 (Yes at step S901), the magnetic tape device 20 outputs to the robot controller 40a, the signals indicating that the operation is started and upon receiving the signals, the robot controller 40a causes the stopper-releasing unit 41 to release the stopper 31 (step S902). The robot controller 40a causes the feeder belt 42 to receive the magnetic tape cartridge 10 inside the robot 40 (step S903) and also causes the first sensor 43 and the second sensor 44 to monitor the position of the magnetic tape cartridge 10 (step S904).

When the magnetic tape cartridge 10 is received up to the predetermined position (Yes at step S904), the robot controller 40a stops the feeder belt 42 (step S905) and the authentication unit 45 checks validity of the magnetic tape cartridge 10 (step S906). When it is not possible to check whether the magnetic tape cartridge 10 is valid (No at step S907), the robot controller 40a causes the feeder belt 42 to return the magnetic tape cartridge 10 to the housing cell 30 (step S908). On the other hand, if the magnetic tape cartridge 10 is valid (Yes at step S907), the robot controller 40a controls the robot 40 such that the magnetic tape cartridge 10 will be conveyed to the drive (step S909) and the process ends.

According to the first embodiment, validity of a magnetic tape cartridge that is inserted from the insertion slot is checked, and only valid magnetic tape cartridges are allowed to be conveyed to the drive. Thus, it is possible to realize security assurance with a compact structure.

In the first embodiment, validity of a magnetic tape cartridge is determined after receiving the magnetic tape cartridge inside the robot from the housing cell. Validity of a magnetic tape cartridge can be determined while the magnetic tape cartridge is retained in the housing cell. This case is explained below as a second embodiment.

The structure of a magnetic tape device 50 according to the second embodiment is explained with reference to FIG. 10. FIG. 10 is a schematic of the magnetic tape device 50. The magnetic tape device 50 includes similarly as the first embodiment, the insertion slot 21 that is set on an anterior surface so that the user can insert the magnetic tape cartridge 10 inside the magnetic tape device 50, a housing cell 60, and a robot 70. Further, the housing cell 60 includes the stopper 31 and an authentication unit 61 that are closely related to the present invention. Similarly, the robot 70 includes a robot controller 70a, the stopper-releasing unit 41, the feeder belt 42, the first sensor 43, and the second sensor 44. Same numerals are assigned to units performing the operations similar to the operations in the first embodiment and the explanation is omitted. Only the housing cell 60, the authentication unit 61, the robot 70, and the robot controller 70a are explained next.

As shown in FIG. 10, the housing cell 60 includes the stopper 31 for ensuring the bound state in which the movement of the magnetic tape cartridge 10 is stopped inside the housing cell 60 in the direction from the housing cell 60 to the robot 70. The housing cell 60 temporarily retains therein the magnetic tape cartridge 10 and also includes the authentication unit 61, which differs from the first embodiment.

The authentication unit 61 checks validity of the magnetic tape cartridge 10 that is temporarily retained in the housing cell 60 and that is in the bound state in which the movement of the magnetic tape cartridge 10 is stopped in the direction from the housing cell 60 to the robot 70. To be specific, upon receiving from the magnetic tape device 50, the signals indicating that the authentication is started, the authentication unit 61 checks validity of the magnetic tape cartridge 10, and only upon recognizing that the magnetic tape cartridge 10 is validity, outputs the signals indicating that the operation is started to the later explained robot controller 70a.

As shown in FIG. 6, the robot 70 includes the robot controller 70a, the stopper-releasing unit 41, the feeder belt 42, the first sensor 43, and the second sensor 44. Upon receiving the magnetic tape cartridge 10 from the housing cell 60 within itself, the robot 70 conveys the magnetic tape cartridge 10 to the drive.

When the authentication unit 61 recognizes that the magnetic tape cartridge 10 is valid, the robot controller 70a releases the bound state of the magnetic tape cartridge 10 and controls the robot 70 such that the magnetic tape cartridge 10 will be conveyed to the drive. When the authentication unit 61 can not recognize whether the magnetic tape cartridge 10 is valid, the robot controller 70a controls the robot 70 such that the bound state of the magnetic tape cartridge 10 will be continued.

To be specific, upon receiving the signals from the authentication unit 61 indicating that the operation is started, the robot controller 70a controls the robot 70 such that the sequence of actions such as receiving the magnetic tape cartridge 10 inside the robot 70 and conveying the magnetic tape cartridge 10 to the drive will be executed. Further, the details of each unit that is controlled by the robot controller 70a are explained with reference to FIG. 11.

FIG. 11 is a flowchart of processes performed by the magnetic tape device 50.

As shown in FIG. 11, if the user presses the load start button when the magnetic tape cartridge 10 is retained in the housing cell 60 (Yes at step S1101), the magnetic tape device 50 outputs to the authentication unit 61, the signals indicating that the authentication is started and upon receiving the signals, the authentication unit 61 determines the validity of the magnetic tape cartridge 10 (step S1102).

When the authentication unit 61 recognizes the validity of the magnetic tape cartridge 10 (Yes at step S1103), the authentication unit 61 outputs to the robot controller 70a, the signals indicating that the operation is started. Upon receiving the signals, the robot controller 70a causes the stopper-releasing unit 41 to release the stopper 31 (step S1104). The robot controller 70a causes the feeder belt 42 to receive the magnetic tape cartridge 10 inside the robot 70 (step S1105) and also causes the first sensor 43 and the second sensor 44 to monitor the position of the magnetic tape cartridge 10 (step S1106). Further, when the authentication unit 61 can not recognize whether the magnetic tape cartridge 10 is valid (No at step S1103), the authentication unit 61 does not output to the robot controller 70a, the signals indicating that the operation is started and the robot 70 cannot execute the sequence of actions by the control of the robot controller 70a.

When the magnetic tape cartridge 10 is received up to the predetermined position (Yes at step S1106), the robot controller 70a stops the feeder belt 42 (step S1107), and controls the robot 70 such that the magnetic tape cartridge 10 will be conveyed to the drive (step S1108) and the process ends.

According to the second embodiment, the magnetic tape device checks validity of the magnetic tape cartridge that is temporarily retained in the housing cell and that is in the bound state in which the movement of the magnetic tape cartridge is stopped in the direction from the housing cell to the robot. Only a valid magnetic tape cartridge is conveyed to the drive. Thus, when compared with the method that carries out authentication in the robot, an invalid magnetic tape cartridge cannot be received in the magnetic tape device, thereby enabling to enhance the security.

The embodiments of the present invention are explained, however, the present invention can be implemented for various different patterns excluding the embodiments explained in the present invention. Further, various modifications are explained as 1 to 3 below:

(1) Existence of the Stopper

In the first embodiment, the housing cell includes the stopper and the bound state is explained in which the movement of the magnetic tape cartridge is stopped in the direction from the housing cell to the robot, however, the present invention is not to be thus limited. The magnetic tape cartridge can be set to the free state in the housing cell without including the stopper. Due to this, even if the magnetic tape cartridge of which the validity is not recognized is received up to the predetermined position in the robot, the magnetic tape cartridge can be returned to the housing cell.

(2) Types of Stopper

In the embodiment mentioned earlier, using the stopper that functions based on the depression of the magnetic tape cartridge and the protrusion of the housing cell is explained. However, the present invention is not to be thus limited. The status can be changed to bound state in which the movement of the magnetic tape cartridge is stopped in the direction from the housing cell to the robot. Further, along with types of stopper, the releasing of the stopper by holding down the predetermined part of the housing cell by the stopper-releasing unit is explained. However, the present invention is not to be thus limited. The bound state of the magnetic tape cartridge can be released.

(3) Determining the Validity

In the embodiments, the method is explained in which the electronic tag is assigned to the magnetic tape cartridge and the data stored in the electronic tag is read to determine the validity of the magnetic tape cartridge. However, the present invention is not to be thus limited. If the method that determines the validity by reading a bar code that is assigned to the magnetic tape cartridge exists, any method can be used.

According to an embodiment of the present invention, validity of a storage medium that is inserted from an insertion slot is checked, and only a valid storage medium is conveyed to a drive. With this configuration, it is possible to realize security assurance with a compact and inexpensive structure.

According to an embodiment of the present invention, validity of a storage medium is while the storage medium is in a housing cell. With this configuration, it is possible to enhance the security.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage medium housing device that internally includes a robot that conveys, from a housing cell that temporarily retains therein a storage medium that is inserted from an insertion slot, the storage medium to a drive that carries out reading and writing of data with respect to the storage medium, and causes the robot to convey, after receiving the storage medium from the housing cell, the storage medium to the drive, the magnetic tape device comprising:

an authentication unit that checks validity of a storage medium that is inserted from the insertion slot; and
a robot controller that controls
   the robot such that the storage medium is conveyed to the drive upon the authentication unit recognizing that the storage medium is valid, and
   the robot such that the storage medium is not conveyed to the drive upon the authentication unit recognizing that the storage medium is non-valid.

2. The storage medium housing device according to claim 1, wherein the authentication unit checks validity of the storage medium that is temporarily retained in the housing cell and that is in a bound state wherein a movement, of the storage medium in a direction from the housing cell to the robot, is stopped, and
the robot controller controls
   the robot such that the storage medium is conveyed, upon releasing the bound state, to the drive upon the authentication unit recognizing that the storage medium is valid, and
   the robot such that the bound state of the storage medium continues upon the authentication unit recognizing that the storage medium is non-valid.

3. The storage medium housing device according to claim 1, wherein the authentication unit checks validity of the storage medium that is received inside the robot and that is in a prior status of startup of conveyance by the robot, and
the robot controller controls,
   the robot such that the storage medium is conveyed to the drive upon the authentication unit recognizing that the storage medium is valid, and
   the robot such that the storage medium is returned to the housing cell upon the authentication unit recognizing that the storage medium is non-valid.

* * * * *